(12) United States Patent
Taylor et al.

(10) Patent No.: US 10,507,917 B2
(45) Date of Patent: Dec. 17, 2019

(54) APPARATUSES AND METHODS FOR GESTURE-CONTROLLED UNMANNED AERIAL VEHICLES

(71) Applicant: Walmart Apollo, LLC, Bentonville, AR (US)

(72) Inventors: Robert C. Taylor, Rogers, AR (US); Donald R. High, Noel, MO (US); John P. Thompson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/913,544

(22) Filed: Mar. 6, 2018

(65) Prior Publication Data

US 2018/0251219 A1    Sep. 6, 2018

Related U.S. Application Data

(60) Provisional application No. 62/467,694, filed on Mar. 6, 2017.

(51) Int. Cl.
*B64C 39/02*    (2006.01)
*G06F 21/32*    (2013.01)
(Continued)

(52) U.S. Cl.
CPC ............ *B64C 39/024* (2013.01); *B64D 47/08* (2013.01); *G06F 3/017* (2013.01); *G06F 3/0304* (2013.01);
(Continued)

(58) Field of Classification Search
None
See application file for complete search history.

(56) References Cited

U.S. PATENT DOCUMENTS

| 8,948,935 | B1 | 2/2015 | Peeters |
| 9,412,278 | B1 | 8/2016 | Gong |

(Continued)

FOREIGN PATENT DOCUMENTS

| CA | 2897096 | 1/2017 |
| DE | 102018000770 A1 | 8/2018 |

OTHER PUBLICATIONS

Cauchard, Jessica et al.; "Drone & Me: An Exlporation Into Natural Human Drone Interaction"; http://hci.stanford.edu/publications/2015/gestures/paper116.pdf; Available at least as early as Nov. 16, 2015; pp. 1-5.

(Continued)

*Primary Examiner* — Angelina Shudy
*Assistant Examiner* — Mahmoud M Kazimi
(74) *Attorney, Agent, or Firm* — Fitch, Even, Tabin & Flannery LLP

(57) ABSTRACT

Systems, apparatuses, and methods are provided herein for unmanned aerial vehicle (UAV) control. A system for UAV control comprises a flight control system of a UAV, an image sensor on the UAV, an aircraft marshaling signal database, and a control circuit coupled to the flight control system, the image sensor, and the aircraft marshaling signal database. The control circuit being configured to: detect, with the image sensor, a gesture from a ground crew member, verify that the ground crew member is an authorized controller of the UAV, compare the gesture with marshaling signals in the aircraft marshaling signal database to determine a corresponding marshaling signal, determine a flight command based on the corresponding marshaling signal, and execute the flight command with the flight control system of the UAV.

16 Claims, 4 Drawing Sheets

120

Ground Crew
Member
130

(51) Int. Cl.
G06F 3/03 (2006.01)
G06K 9/00 (2006.01)
G06F 3/01 (2006.01)
G08G 5/00 (2006.01)
B64D 47/08 (2006.01)

(52) U.S. Cl.
CPC .......... *G06F 21/32* (2013.01); *G06K 9/0063* (2013.01); *G06K 9/00355* (2013.01); *G08G 5/0069* (2013.01); *B64C 2201/123* (2013.01); *B64C 2201/146* (2013.01)

(56) References Cited

U.S. PATENT DOCUMENTS

| | | | | |
|---|---|---|---|---|
| 9,459,620 | B1* | 10/2016 | Schaffalitzky | G05D 1/0016 |
| 2006/0058928 | A1* | 3/2006 | Beard | G01C 23/005 |
| | | | | 701/11 |
| 2009/0222149 | A1* | 9/2009 | Murray | A63H 30/04 |
| | | | | 701/2 |
| 2010/0235034 | A1* | 9/2010 | Higgins | G05D 1/0083 |
| | | | | 701/28 |
| 2013/0253733 | A1 | 9/2013 | Lee | |
| 2016/0070260 | A1 | 3/2016 | Levien | |
| 2016/0189101 | A1 | 6/2016 | Kantor | |
| 2016/0274578 | A1 | 9/2016 | Arwine | |

OTHER PUBLICATIONS

Deruiter, Emily; "Students create drones controlled by hand gestures"; http://www.cmlife.com/article/2015/04/uavdroneresearch; Available at least as early as Apr. 7, 2015; pp. 1-2.

Qorashi, David; "Exploring Alternative Control Modalities for Unmanned Aerial Vehicles"; https://www.slideshare.net/daqo/using-hand-gestures-to-fly-uavs; Jun. 5, 2018; pp. 1-6.

UKIPO; App No. GB1905242.2; Combined Search and Examination Report dated Oct. 10, 2019.

* cited by examiner

APPARATUSES AND METHODS FOR GESTURE-CONTROLLED UNMANNED AERIAL VEHICLES

CROSS-REFERENCE TO RELATED APPLICATION

This application claims the benefit of U.S. Provisional Application No. 62/467,694 filed Mar. 6, 2017, which is incorporated herein by reference in its entirety.

TECHNICAL FIELD

This invention relates generally to unmanned aerial systems.

BACKGROUND

An unmanned aerial vehicle (UAV), also referred to as an aerial drone and an unmanned aircraft system (UAS), is an aircraft without a human pilot aboard.

BRIEF DESCRIPTION OF THE DRAWINGS

Disclosed herein are embodiments of apparatuses and methods for UAV control. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for unmanned aerial vehicle (UAV) control. In one embodiment, a system for UAV control comprises a flight control system of a UAV, an image sensor on the UAV, an aircraft marshaling signal database, and a control circuit coupled to the flight control system, the image sensor, and the aircraft marshaling signal database. The control circuit being configured to: detect, with the image sensor, a gesture from a ground crew member, verify that the ground crew member is an authorized controller of the UAV, compare the gesture with marshaling signals in the aircraft marshaling signal database to determine a corresponding marshaling signal, determine a flight command based on the corresponding marshaling signal, and execute the flight command with the flight control system of the UAV.

Figure 1:
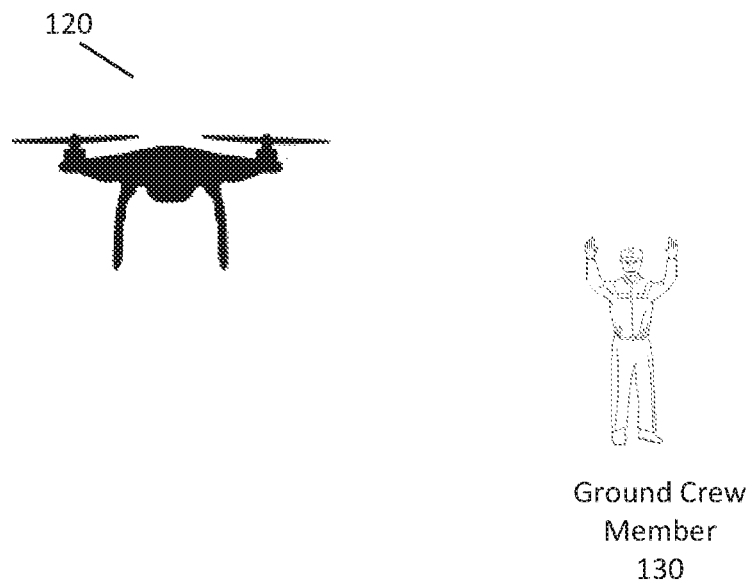
FIG. 1 is a diagram in accordance with several embodiments.

Referring now to FIG. 1, a diagram according to some embodiments is shown. In FIG. 1, a UAV 120 is configured to respond to gesture controls from a ground crew member 130. The UAV 120 comprises an aerial vehicle configured to perform one or more tasks autonomously, semi-autonomously, and/or as controlled by a remote pilot. In some embodiments, the UAV 120 comprises a body, a plurality of wings and motors, and a sensor system. In some embodiments, the UAV 120 may further comprise an aerial crane or other package retrieval, transport, and/or release mechanisms. In some embodiments, the UAV 120 may comprise a multicopter configured to hover at and/or near a pickup location and/or a drop off location. In some embodiments, the UAV 120 may comprise a bicopter, a tricopter, a quadcopter, a hexacopter, an octocopter, etc. In some embodiments, the UAV 120 may comprise an air chamber (e.g. balloon, blimp, etc.) storing lighter than air gas for providing lift to the UAV 120. In some embodiments, the UAV 120 may comprise a communication device configured to communicate with the central computer system and/or a remote pilot, a GPS receiver configured to provide geolocation information to the UAV 120, and a control circuit configured to control the navigation and task performance of the UAV 120. In some embodiments, the UAV 120 may be configured to detect gestures from the ground crew member 130, authenticate the ground crew member 130 as an authorized controller, and execute flight commands based on the detected gestures.

The ground crew member 130 generally refers to a human signaler who gestures to the UAV 120. In some embodiments, the ground crew member 130 may comprise a worker at a UAV package pickup or receiving center. In some embodiments, the ground crew member 130 may comprise a customer. In some embodiments, the ground crew member 130 may comprise a third party controller or a passerby encountered by the UAV 120 on the way to a destination. In some embodiments, the UAV 120 may authenticate the ground crew member 130 and determine whether to accept commands from the ground crew member based on one or more of a location of the UAV, a location of the ground crew member 130, a visual identifier associated with the ground crew member 130, a facial recognition algorithm, and a wireless signal transmitted by a transmitter device associated with the ground crew member 130. For example, the UAV 120 may be configured to only respond to gesture controls from ground crew members located within the delivery location indicated in its task profile. In some embodiments, the UAV may be configured to distinguish between marshaling signals and emergency gestures (e.g. frantic arm waving, jumping) and may respond to emergency gestures without authenticating the signaler.

While one pair of UAV 120 and ground crew member 130 are shown in FIG. 1, in some embodiments, the UAV 120 may be configured to respond to gesture controls from different ground crew members at different times. In some embodiments, the ground crew member 130 may issue marshaling signals to a plurality of UAV simultaneously or at different times. In some embodiments, configuring UAVs to accept gesture controls allows UAVs to be controlled by a ground crew member without requiring data connectivity between the UAV and the ground facility. In some embodiments, controlling UAVs with gestures may avoid exposing private data and/or networks associated with the UAV and/or the ground facility to unauthorized access. The gesture control scheme can also avoid requiring the UAV to have a compatible software controller and/or a compatible transceiver to be controlled by the ground facility via wireless data signals. In some embodiments, using gesture controls may allow the ground crew member to keep their eyes on the UAV and the flight condition around the UAV while issuing flight commands. In some embodiments, the gesture controls may serve as a backup control method in case a data connection cannot be established between a UAV and a ground controller.

Figure 2:
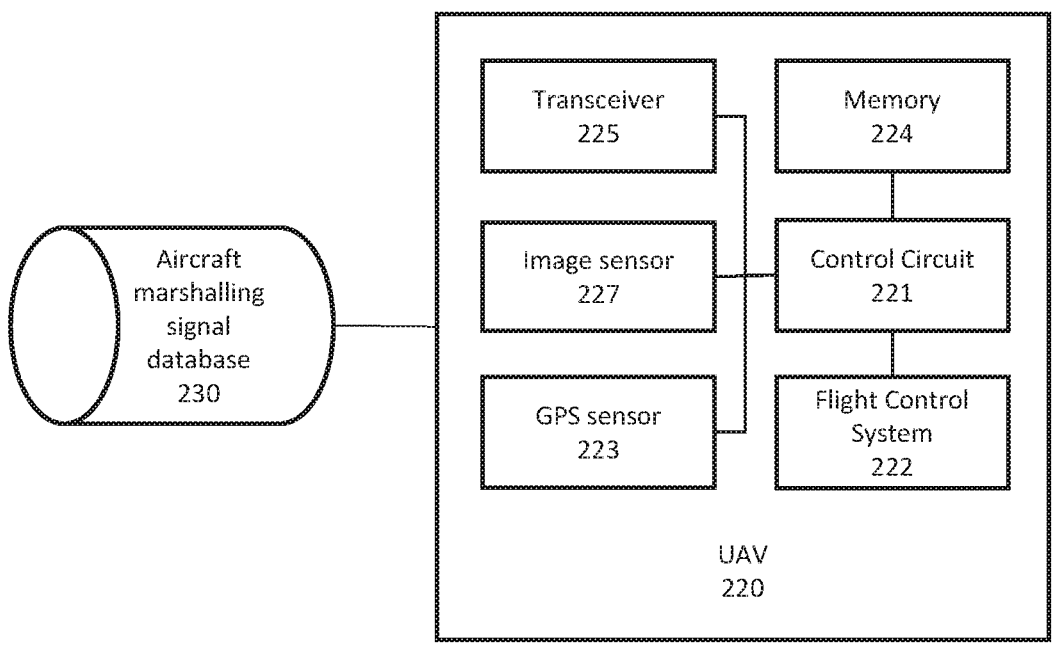
FIG. 2 is a block diagram of a system in accordance with several embodiments.

Referring now to FIG. 2, a block diagram of a UAV according to some embodiments is shown. The UAV 220 comprises a control circuit 221, a flight control system 222, a GPS sensor 223, a memory 224, a transceiver 225, and an image sensor 227. The UAV 220 also accesses an aircraft marshaling signal database 230.

The UAV 220 may comprise an aerial vehicle without a pilot onboard that is configured to perform one or more tasks while in flight. The UAV 120 comprises a body, a plurality of wings and/or motors, and a sensor system. In some embodiments, the UAV 220 may further comprise an aerial crane and/or other package retrieval, transport, and/or release mechanism. In some embodiments, the UAV 220 may comprise a multicopter configured to hover at and/or near a pickup location and/or a drop off location. In some embodiments, the UAV 220 may comprise a bicopter, a tricopter, a quadcopter, a hexacopter, an octocopter, etc.

In some embodiments, the UAV 220 may be configured to perform one or more types of tasks. In some embodiments, a UAV task may comprise a package delivery and/or package pickup task. In some embodiments, a UAV task may relate to one or more of agriculture, farming, livestock management, geological survey, scientific study, wildlife study, wildlife management, security surveillance, forestry, marine study, etc. In some embodiments, a task may comprise a data gathering task and/or action task in which UAV 220 acts to affect the environment, animals, and/or persons around it. In some embodiments, UAV tasks may be performed with one or more modular attachments to the UAV 220. In some embodiments, two or more UAVs may be configured to collectively perform a task. In some embodiments, the UAV 220 may comprise the UAV 120 described with reference to FIG. 1, the UAV 500 described with reference to FIG. 5, or a similar device.

The control circuit 221 may comprise a central processing unit, a processor, a microprocessor, and the like. The control circuit 221 may be communicatively coupled to one or more of the flight control system 222, the GPS sensor 223, the memory 224, the transceiver 225, the image sensor 227, and the aircraft marshaling signal database 230. Generally, the control circuit 221 is be configured to navigate the UAV 220 and cause the UAV 220 to perform assigned tasks. The control circuit 221 may be configured to execute computer readable instructions stored on a computer readable storage memory 224. The control circuit 221 may generally be configured to detect gestures via the image sensor 227 and determine whether to execute a flight command with the flight control system 222. In some embodiments, the control circuit 221 may be configured to determine a flight path and/or flight pattern for the UAV 120 based on one or more of a task profile stored in the memory 224, real-time information detected by one or more onboard sensors, information received from a remote central computer, and gestures detected via the image sensor 227. In some embodiments, the control circuit 221 may perform one or more steps described with reference to FIGS. 3 and 6 herein. In some embodiments, the control circuit 221 may be configured to detect gestures and determine flight commands described herein with or without communicating with a remote server and/or a remote human pilot.

The computer readable storage memory 224 may comprise volatile and/or non-volatile memory and have stored upon it a set of computer readable instructions which, when executed by the control circuit 221, causes the system to detect and respond to gestures. In some embodiments, the memory 224 may further store task profiles of tasks assigned to the UAV 220 which the control circuit 221 can use to control the UAV 220 and perform tasks. In some embodiments, the computer-executable instructions may cause the control circuit 221 of the UAV 220 to perform one or more steps described with reference to FIGS. 3 and 6 herein.

The flight control system 222 may comprise motors, propellers, and/or wing systems that control one or more of a speed, direction, altitude, and/or orientation of the UAV 220. In some embodiments, the flight control system 222 may comprise locomotion devices controlled by the control circuit 221 to lift and steer the UAV 220.

The GPS sensor 223 may be configured to provide GPS coordinates to the control circuit 221 for geolocation and navigation. In some embodiments, the UAV 220 may further include an altimeter for providing altitude information and/or a gyroscope for providing orientation information to the control circuit 221 for navigation. In some embodiments, the control circuit 221 may use the GPS information from the GPS sensor 223 to determine whether the UAV 220 is at a location indicated in a task profile (e.g. package pickup location, package drop off location, etc.).

The transceiver 225 may comprise one or more of a mobile data network transceiver, a satellite network transceiver, a WiMax transceiver, a Wi-Fi transceiver, a Bluetooth transceiver, a RFID reader, and the like. In some embodiments, the transceiver 225 may be configured to allow the control circuit 221 to communicate with a remote central computer system, another UAV, and/or a device associated with a ground crew member. In some embodiments, the UAV 220 may be configured to autonomously travel and perform tasks for extended periods of time without communicating with a remote system. In some embodiments, the transceiver 225 may maintain at least periodic communication with a remote central computer system while the UAV 220 travels and performs tasks. In some embodiments, one or more functions performed by the control circuit 221 described herein may be performed by the control circuit 221 and/or a remote central computer system with communications via the transceiver 225. In some embodiments, the transceiver 225 may be configured to allow a remote human pilot to control the UAV 220. For example, flight data such as information collected by the GPS sensor and/or the image sensor 227 may be transmitted to a user interface device of a remote human pilot, and the human pilot may control the flight of the UAV 220 at least during a portion of the flight. In some embodiments, the transceiver 225 may be configured to detect for transmissions associated with? the ground crew member. For example, a ground facility and/or a device carried by the ground crew member may transmit an identifying signal (e.g. beacon). The transceiver 225 may detect for transmitted signals to determine whether a crew member is an authorized controller or not. In some embodiments, the transceiver 225 may be configured to receive wireless flight control signals from a ground facility in addition to or in place of the visual marshaling signals.

The image sensor 227 may generally be configured to detect the gestures of a ground crew member. In some embodiments, the image sensor 227 may comprise one or more of a camera, an optical sensor, an infrared sensor, a night vision camera, etc. In some embodiments, human gestures may be detected by capturing one or more images of the ground crew member. In some embodiments, the gesture may be detected based on one or more visual identifiers carried by the ground crew member, such as batons, flags, signs, reflectors, light emitters, patterned clothing, patterned gloves, etc. In some embodiments, the image sensor 227 may comprise a navigation camera of the UAV 220 used to detect for obstacles and/or other visual navigation markers in the path of flight. In some embodiments, the UAV 220 may include other flight sensors such as lasers and radars for detecting obstacles in the path of flight to avoid collisions. In some embodiments, the UAV 220 may comprise a plurality of sensors for capturing environmental data around the UAV 220 such as one or more of a wind sensor, a light sensor, an optical sensor, a visibility sensor, a weather sensor, a barometric pressure sensor, a range sensor, a humidity sensor, a sound sensor, a thermal image sensor, a night vision camera, etc. In some embodiments, the environmental data may comprise context information used by the UAV in determining how to respond to a human gesture.

The aircraft marshaling signal database 230 may comprise computer-readable memory storage storing a plurality of gestures associated with marshaling signals. In some embodiments, the marshaling signals in the aircraft marshaling signal database 230 comprise standardized marshaling signals from one or more of the North Atlantic Treaty Organization (NATO) Standardization Agreement 3117, Air Standardization Coordinating Committee Air Standard 44/42a, the International Civil Aviation Organization (ICAO), and the Federal Aviation Administration (FAA). In some embodiments, the marshaling signals in the aircraft marshaling signal database 230 correspond to directions to perform one or more of: travel straight ahead, turn left, turn right, move back, slow down, start engine, stop engine, take off, and land. In some embodiments, the marshaling signals in the aircraft marshaling signal database 230 further comprise specialized UAV marshaling signals corresponding to directions to: release package, pick up package, follow another UAV, and/or return to an origin location. In some embodiments, the aircraft marshaling signal database 230 or another database may store authorization information on authorized controllers for the UAV 220. For example, authorization information may comprise authorized control locations, visual identifiers associated with? authorized members, facial feature profiles of authorized members, authorization codes, and/or encrypted authorization passcodes. In some embodiments, the aircraft marshaling signal database 230 or another database may store emergency gesture profiles corresponding to dangerous and/or urgent conditions. For example, the UAV 220 may be configured to detect frantic arm waving or object waving using the database and respond accordingly.

While the aircraft marshaling signal database 230 is shown to be outside of the UAV 220, in some embodiments, the aircraft marshaling signal database 230 may be implemented on the memory 224 onboard the UAV 220. In some embodiments, the UAV 220 may be configured to independently respond to marshaling signals based on the onboard aircraft marshaling signal database 230 without communicating with another device. In some embodiments, the aircraft marshaling signal database 230 may comprise a remote or a cloud based storage device accessed by the UAV 220 via the transceiver 225. In some embodiments, the images captured by the image sensor 227 may be transmitted to a remote computer that processes the images, compares the images with the aircraft marshaling signal database 230, determines a flight command, and transmits the determined flight command back to the UAV 220 via the transceiver 225.

Figure 3:
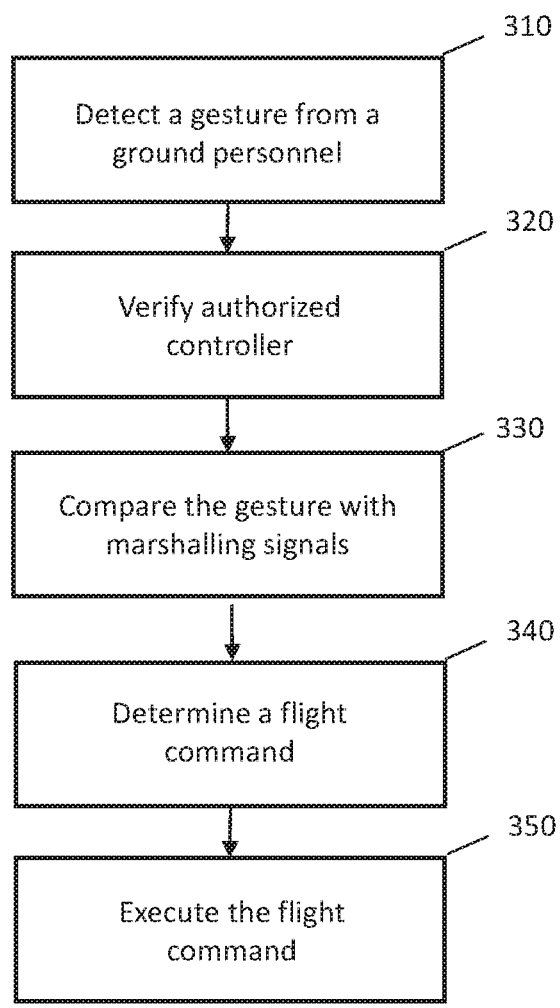
FIG. 3 is a flow diagram of a method in accordance with several embodiments.

Referring now to FIG. 3, a method of UAV control is shown. In some embodiments, the steps shown in FIG. 3 may be performed by a processor-based device, such as the control system of a UAV and/or a remote central computer system communicating with a UAV. In some embodiments, one or more steps shown in FIG. 3 may be performed by the UAV 120, the UAV 220, a computer system communicating with the UAV 220, the UAV 500, and/or the UAV controller 510 described herein or similar devices.

In step 310, the system detects a gesture from a ground crew member. In some embodiments, the gesture may be detected by an image sensor of a UAV. In some embodiments, the image sensor may comprise one or more of a camera, an optical sensor, a night vision camera, and an infrared camera. In some embodiments, the gesture may comprise one or more of hand, arm, torso, head, and leg position and/or movement. In some embodiments, the gesture may be detected based on the position and/or movement of one or more visual identifiers carried by the ground crew member, such as batons, flags, signs, reflectors, light emitter, patterned clothing, patterned gloves, etc. In some embodiments, the gesture may be detected based on one or more images of the ground crew member.

In step 320, the system verifies that the ground crew member is an authorized controller of the UAV. In some embodiments, the ground crew member may be verified based on one or more of: a location of the UAV, a location of the ground crew member, a visual identifier associated with the ground crew member, a facial recognition algorithm, and a wireless signal transmitted by a transmitter device associated with the ground crew member. In some embodiments, the UAV may store the GPS coordinates and/or other visual markers associated with a location associated with an assigned task. The UAV may then be configured to identify the ground crew member located at the location as an authorized controller. In some embodiments, the UAV may be configured to detect for a visual identifier that is worn, carried, or in close proximity of a ground crew member to verify that the ground crew member is an authorized controller. For example, the ground crew member may wear a vest with the markings, patterns, and/or optical codes as visual identifiers for the UAV. In some embodiments, the visual identifier may be uniquely associated with the UAV. For example, a central computer system may provide the ground crew member with a QR (Quick Response) code associated with the UAV ahead of the UAV's arrival. The ground crew member may print out the QR code and/or display the QR code on a display device for the UAV to identify an authorized controller. The unique identifier may also allow the UAV to identify a controller assigned to the UAV if multiple controllers are present. In some embodiments, the UAV may be configured to use a facial recognition algorithm to identify the ground crew member and determine whether the ground crew member is an authorized controller. For example, authorized controllers may be registered in an authorized controller database storing photos of the controller for facial recognition. In some embodiments, images of authorized controllers may be provided to the UAV in a task profile, and the UAV may be configured to only accept gesture controls from persons specified in the task profile. In some embodiments, the UAV may detect for a transmitted wireless signal to determine whether an authorized ground crew member is present. In some embodiments, the UAV may be configured to perform a wireless handshake with an electronic device associated with the ground crew member to authenticate the ground crew member. In some embodiments, the electronic device may be associated with a ground facility (e.g. package drop off or pickup location) and/or carried by the ground crew member.

In some embodiments, the system may further be configured to detect an initiate-control gesture from the ground crew member prior to one or more of steps 310, 320, and 330. In some embodiments, the initiate-control gesture may comprise a gesture indicating that a ground crew member is about to provide marshaling signals to the UAV. For example, the initiate-control gesture may comprise a ground crew member pointing at a UAV for an extended period of time. In another example, the initiate-control gesture may comprise a ground crew member pointing at a UAV with one hand, while drawing a pattern (e.g. circle, arrow, etc.) with another hand. Generally, the initiate-control gesture may comprise any gesture identifiable by the UAV.

In some embodiments, the UAV may be configured to provide an initiate-control acknowledgment to the ground crew member in response to detecting the initiate-control gesture and verifying that the ground crew member is an authorized controller of the UAV in step 320. In some embodiments, the UAV may move in a predetermined pattern (e.g. small circle, quick up and down motion, etc.) to signal to a ground crew member that gesture control is initiated. In some embodiments, the UAV may actuate a visual indicator (e.g. LED light, retractable landing gear, etc.) or produce an audible sound to signal the acknowledgment to the ground crew member. In some embodiments, after the ground crew member is verified to be an authorized controller, the UAV may be "paired" with the controller and begin to receive gesture commands from the ground crew member. In some embodiments, the UAV may only execute the flight command in step 350 if the UAV has been paired with the ground crew member and the ground crew member is determined to be an authorized controller in step 320.

In step 330, the system compares the gesture with marshaling signals in the aircraft marshaling signal database to determine a corresponding marshaling signal. In some embodiments, the gesture may comprise the gesture detected in step 310. In some embodiments, the marshaling signals in the aircraft marshaling signal database comprise standardized marshaling signals from one or more of the North Atlantic Treaty Organization (NATO) Standardization Agreement 3117, Air Standardization Coordinating Committee Air Standard 44/42a, the International Civil Aviation Organization (ICAO), and the Federal Aviation Administration (FAA). In some embodiments, the marshaling signals in the aircraft marshaling signal database correspond to directions to perform one or more of: travel straight ahead, turn left, turn right, move back, slow down, start engine, stop engine, take off, and land. In some embodiments, the marshaling signals in the aircraft marshaling signal database further comprise specialized UAV marshaling signals corresponding to directions to: release package, pick up package, follow another UAV, and/or return to an origin location.

Figure 4:
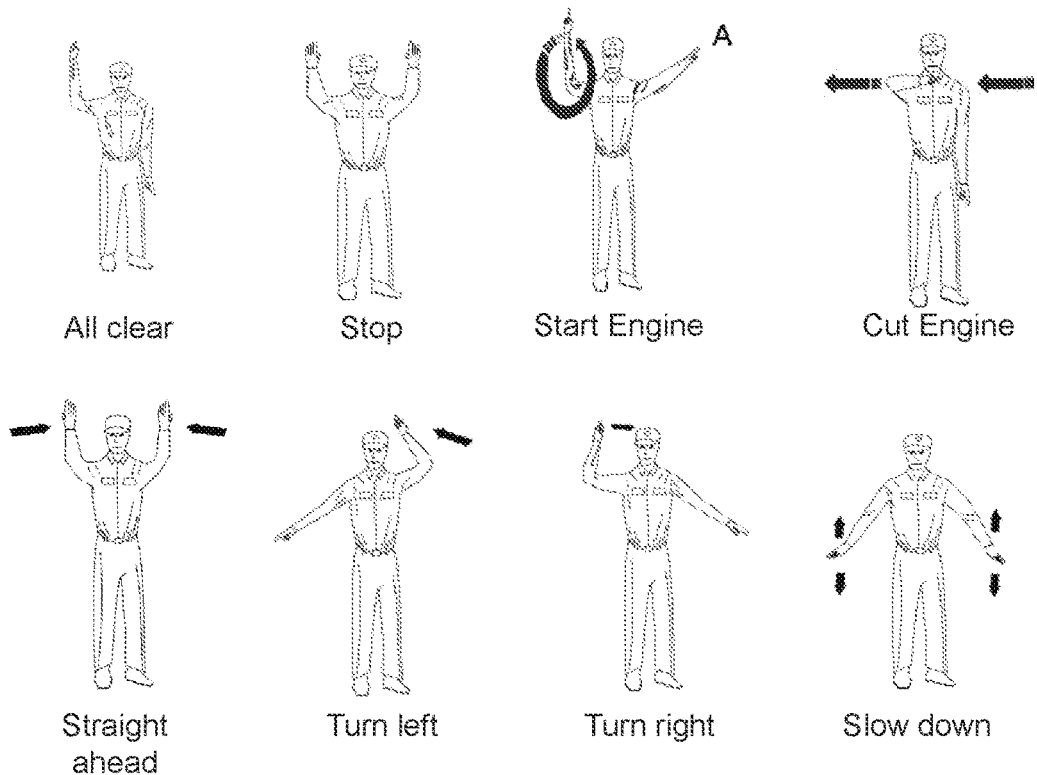
FIG. 4 includes illustrations of marshaling signals in accordance with several embodiments.

In some embodiments, the marshaling signals in the database may comprise outlines or body segment models of human movement and the captured images may be converted to outlines or body segment models of the movement for comparison. Several examples of standardized marshaling signals are illustrated in FIG. 4 and described herein.

In step 340, the system determines a flight command based on the corresponding marshaling signal. In some embodiments, the flight command may correspond to the direction given through the marshaling signal (e.g. hover, turn right, turn left). In some embodiments, the flight command may comprise a modification to a current task of the UAV. For example, a UAV's current task may direct the UAV to land at location X, and the UAV may land at a different location in response to the marshaling signal. In another example, the UAV's current task may be to take off at 2:30 pm, but the UAV may take off earlier or later as directed by the marshaling signal. In some embodiments, the flight command may be determined based on a current task of the UAV. For example, if a UAV is currently carrying a package with an aerial crane, the UAV may disregard marshaling signals to land the UAV without first releasing the package. In some embodiments, the task profile may specify parameters in which marshaling signal commands should be accepted. For example, for a UAV traveling from an origin to a destination, the UAV may be configured to disregard any marshaling signals until the UAV is in close proximity to the destination location. In some embodiments, the task profile may specify one or more waypoints stations around which the UAV may respond to marshaling signals. In some embodiments, the flight command may further be determined based on other context information such as weather, wind condition, time of the day, cargo, battery level, etc. In some embodiments, the task profiles may comprise one or more rules on whether and how to respond to different marshaling signals under different conditions, and the UAV may determine a flight command to execute accordingly.

In step 350, the system executes the flight command with the flight control system of the UAV. In some embodiments, the flight command may be converted to control signals for one or more of motors, propellers, landing gears, and wings of the UAV. In some embodiments, the flight command may correspond to a change in the UAV's speed, direction, orientation, altitude, etc. In some embodiments, the flight command may comprise a temporary deviation from the UAV's preassigned task (e.g. extend hover until given signal to land). In some embodiments, the flight command may comprise a permanent change to the UAV's preassigned task (e.g. change package release location, return to origin without landing).

After step 350, the UAV may return to step 310 and continue to detect gestures from the ground crew member and/or return to performing the assigned task. In some embodiments, step 320 may be skipped for previously authorized controllers. In some embodiments, one or more of steps 310-320 may be performed with the onboard system of the UAV, with a central computer system communicating with the UAV, and/or with a remote pilot controlling the UAV.

Referring now to FIG. 4, illustrations of marshaling signals are shown. The marshaling signals shown in FIG. 4 are signals standardized by the Federal Aviation Administration (FAA) of the United States of America. The illustrations in FIG. 4 include marshaling signals for "all clear," "stop," "start engine," "cut engine," "straight ahead," "turn left," "turn right," and "slow down." The illustrations in FIG. 4 are provided as examples only. The FAA marshaling signals comprise additional signals for airplanes and helicopters. In some embodiments, the marshaling signals in the aircraft marshaling signal database may alternatively or additionally comprise standardized marshaling signals from one or more of the North Atlantic Treaty Organization (NATO) Standardization Agreement 3117 Air Standardization Coordinating Committee Air Standard 44/42a, the International Civil Aviation Organization (ICAO), and other government and/or standardization organizations. In some embodiments, the marshaling signals in the aircraft marshaling signal database further comprise specialized UAV marshaling signals corresponding to directions to: release package, pick up package, follow another UAV, and/or return to an origin location. In some embodiments, the specialized UAV marshaling signals may comprise a proprietary set of gestures, a common set of gestures shared by several companies, an industry standard set of gestures, a standardization organization approved set of gestures, and/or a government codified set of gestures.

Figure 5:
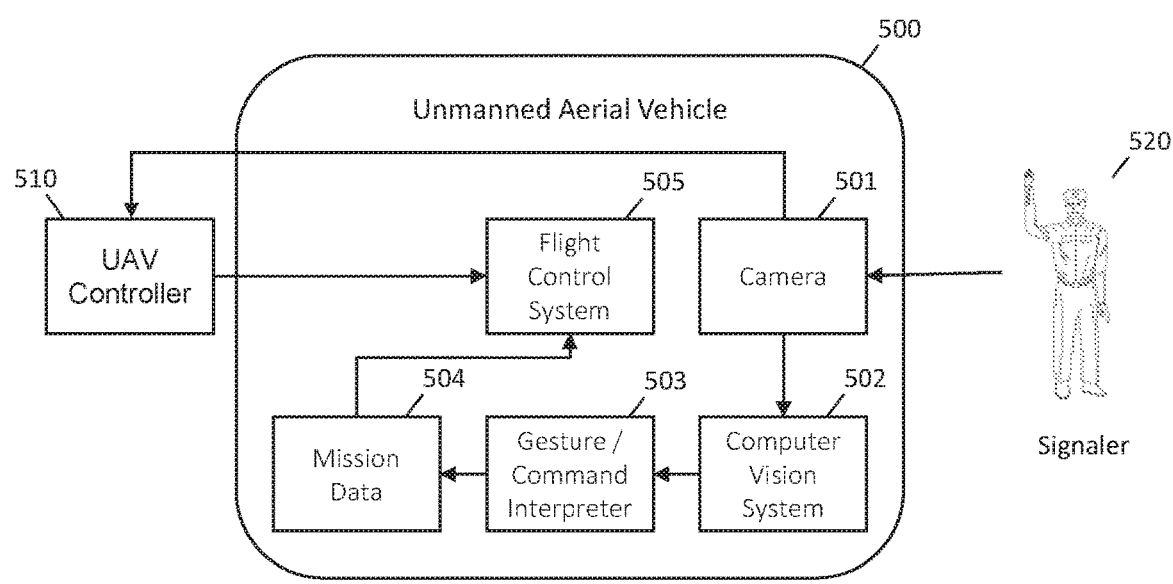
FIG. 5 is a block diagram of a system in accordance with several embodiments.

Referring now to FIG. 5, a block diagram of a system according to some embodiments is shown. The system comprises a UAV 500, a UAV controller 510, and a signaler 520.

In some embodiments, the UAV 500 may comprise the UAV 120 described with reference to FIG. 1, the UAV 220 described with reference to FIG. 2 or a similar device. The UAV 500 comprises a camera 501, a computer vision system 502, a gesture/command interpreter 503, a mission data module 504, and a flight control system 505. The camera 501 is configured to capture images of the signaler 520. The computer vision system 502 is configured to process the images captured by the camera 501. For example, the computer vision system 502 may isolate the controller from the background via object and/or facial recognition. The image then passes through the gesture/command interpreter 503 to determine the intended command of the signaler. The interpreted command is processed through the mission data module 504 to determine how the UAV 500 would respond to the gesture. In some embodiments, the mission data comprises task profiles and/or parameters through which gestures and commands are filtered. For example, the mission data and/or task profile may specify the conditions under which different types of gesture commands would be executed or disregarded. The flight control system 505 may control the motor and/or propeller systems to affect one or more of a speed, direction, altitude, and/or orientation of the UAV 500. The flight control system 505 may further be configured to control other devices on the UAV 500 such as visual indicators, audio devices, retractable landing gears, aerial cranes, and package retrieval/release systems.

In some embodiments, the image feed from the camera 501 may be additionally and/or alternatively provided to a UAV controller 510 that is remote to the UAV 500. In some embodiments, the UAV controller 510 may comprise a remote computer system that provides instructions to the flight control system of the UAV 500 through wireless communication. In some embodiments, the UAV controller 510 may comprise a user interface device configured to allow a UAV pilot to control the UAV 500 from a remote location. The remote system and/or the UAV pilot may use the image feed of the camera 501 to cause the flight control system 505 of the UAV 500 to respond to gestures of the signaler 520.

In some embodiments, one or more of the computer vision system 502, the gesture/command interpreter 503, the mission data module 504, and the flight control system 505 may comprise one or more hardware modules and/or software modules implemented with a control circuit of the UAV 500.

Figure 6:
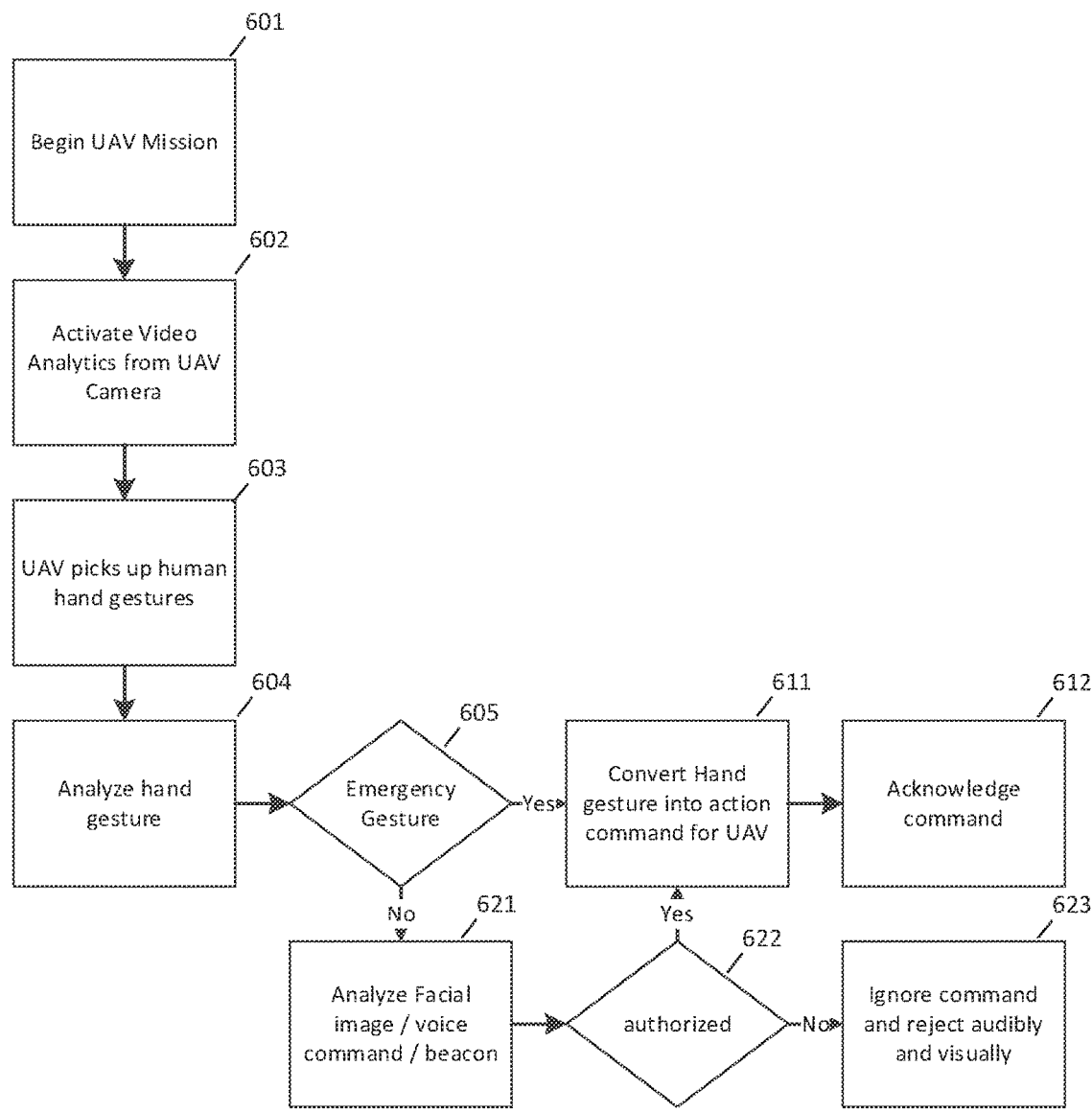
FIG. 6 is a flow diagram of a method in accordance with several embodiments.

Referring now to FIG. 6, a method of UAV control is shown. In some embodiments, the steps shown in FIG. 6 may be performed by a processor-based device, such as the control system of a UAV and/or a remote central computer system communicating with a UAV. In some embodiments, one or more steps shown in FIG. 6 may be performed by the UAV 120, the UAV 220, a computer system communicating with the UAV 220, the UAV 500, and/or the UAV controller 510 described herein or similar devices.

In step 601, the system begins a UAV mission. In some embodiments, a UAV mission profile or task profile with directions for a UAV to perform a task is loaded onto the UAV in step 601. In step 602, the system activates video analytics from the UAV camera. In step 603, the UAV picks up a human hand gesture with an onboard camera. In step 604, the system analyzes the hand gestures captured by the camera. In step 605, the system determines whether the gesture is an emergency gesture. In some embodiments, an emergency gesture may comprise a gesture indicative of a dangerous and/or threatening condition. In some embodiments, emergency gestures may correspond to frantic arm waving, waving of a weapon, jumping, etc. In some embodiments, emergency gestures may be detected based on a combination of gesture and sound (e.g. screaming, yelling, etc.).

If the gesture is determined to be an emergency gesture, the process proceeds to step 611, and the system converts hand gesture into action command for the UAV. In step 612, the UAV acknowledges the command and performs the action command. In some embodiments, the UAV may be configured to communicate an acknowledgment via visual motion and/or with a sound. In some embodiments, the UAV may be configured to respond to emergency gestures by flying away from the signaler or aborting a landing or delivery attempt. In some embodiments, the UAV may be configured to respond to emergency gestures by alerting a remote human controller and providing a video feed of the signaler to the controller.

If the gesture is determined to not be an emergency gesture in step 605, the process proceeds to step 621 and the system analyzes one or more of a facial image, a voice command, and/or an electronic beacon associated with the signaler. In step 622, the system determines whether the signaler is authorized based on the information collected and analyzed in step 621. If the signaler is not authorized, the process proceeds to step 623 and the system ignores the command. In some embodiments, the UAV may be configured to audibly and/or visually indicate that the command is rejected. If the signaler is determined to be authorized in step 622, the process proceeds to step 611 and the system converts the hand gesture into action command for the UAV. The UAV then acknowledges the command and performs the action in step 612. In some embodiments, the UAV may be configured to communicate the acknowledged command via visual motion and/or with a sound.

In some embodiments, UAVs may be used for last mile deliveries. While UAVs may be configured to operate autonomously, there may be a need for operators to modify the parameters of operation through gestures rather than direct control. For example, during a package delivery, destination conditions might not match the calculated GPS coordinates or the expected location condition. In such cases, a person at the delivery location may need to give instructions to a UAV or its pilot-in-control (PIC) to adjust for the unexpected conditions.

In some embodiments, UAVs may include onboard cameras that can be used to recognize standard and/or custom hand signals that initiate or modify portions of an unmanned vehicle mission. The UAV may be configured to respond to standard hand signals used to instruct a human pilot of a traditional helicopter or aircraft, such as start engine, take off, hover, move downward or upward, turn left or right, land, abort landing, etc. In some embodiments, a UAV may be configured to respond to other signals associated with instructions to deliver package, refuse package, adjust landing location, open delivery locker, deposit package in locker, close locker, return to launch vehicle, etc.

In some embodiments, a UAV may be configured to respond to hand signals to perform a package delivery task. In some embodiments, a UAV system configured to recognize human hand gestures for guidance and control is provided. The system may include a UAV with the ability to recognize faces, clothing, voices, infrared signatures, and/or other symbols to authenticate a human controller. Once the controller is authenticated, the system may detect and recognize hand gestures from the individual in real-time to guide the UAV. In some embodiments, the UAV may further be configured to recognize static and/or dynamic signs that would provide guidance and control to the UAV. In some embodiments, the UAV may be configured to recognize standard and custom gestures (e.g. marshaling signals) to cause the UAV to deviate from and/or modify its preprogrammed task.

In some embodiments, the methods described herein provide a collection of gestures discernable by a UAV and/or a human pilot. In some embodiments, the gestures may include standard marshaling signals used for helicopters and/or custom hand signals for actions specific to retail package delivery. In some embodiments, a UAV may comprise a computer vision system configured to isolate and interpret hand signals and other gestures. The system may then update mission data and make changes through the flight control system based on the gesture command. In some embodiments, the system may be configured to allow a remote pilot of a UAV to view detected gestures and provide flight control system updates in response to those gestures. In some embodiments, a system described herein may be configured to confirm whether the flight control system should act on the interpreted gestures. A UAV may be configured to autonomously respond to gesture commands with action command while allowing manual override of the action command.

An unmanned flight mission may include instructions for a UAV to automatically fly from one GPS location to another. However, GPS-based geolocation may have varying degrees of accuracy; with fewer satellites visible, GPS accuracy declines. Additionally, elevation, obstructions, and features of the delivery zone may not match the information obtained through a mapping service. In some embodiments, systems described herein may allow finer grained control of UAVs to avoid unexpected obstacles or to react to unforeseen weather or ground conditions. In some embodiments, gesture commands and/or marshaling signals may comprise one or more of: Clear to Start (engage propellers, but do not generate enough lift to take off), Hold on Ground (generate downforce to hold the aircraft on the ground), Move Upward (increase elevation, taking into account any programmed GPS waypoints at the current location and limitations on maximum height above ground level), Move Downward (decrease elevation, taking into account any programmed GPS waypoints at the current location), Move Left (move to the left based on signaler's position, taking into account any programmed GPS waypoints at the current location), Move Right (move to the right based on signaler's position, taking into account any programmed GPS waypoints at the current location), Land Here (land at the location directly below the current hover point, or on a designated landing location), Hold Hover (maintain elevation and position), Clear to Take-Off (increase propeller speed to take-off velocity and proceed to a waypoint in the direction indicated), Release Sling Load (use sky crane to lower package to the ground for delivery), Shut Off Engine (after ensuring the UAV is at ground level, shut off the engine), Move Forward (move towards the signaler's position, taking into account any programmed GPS waypoints at the current location), Move Backward (move away from the signaler's position, taking into account any programmed GPS waypoints at the current location), Wave Off—Don't Land (abort attempted landing, return either to the last hover waypoint or the original launch location).

In some embodiments, hand signals may be interpreted by a pilot-in-command (PIC) to verify or modify portions of a UAV mission. In some embodiments, a computer vision system may automatically recognize hand signals. Those hand signals may be interpreted and used to update the mission data, potentially resulting in changes to the programmed flight tasks. In some embodiments, a PIC may authorize or prohibit the system from acting in response to gesture signals based on determining whether the signals are properly interpreted and/or are safe to execute.

In one embodiment, a system for unmanned aerial vehicle (UAV) control comprises a flight control system of a UAV, an image sensor on the UAV, an aircraft marshaling signal database, and a control circuit coupled to the flight control system, the image sensor, and the aircraft marshaling signal database. The control circuit being configured to: detect, with the image sensor, a gesture from a ground crew member, verify that the ground crew member is an authorized controller of the UAV, compare the gesture with marshaling signals in the aircraft marshaling signal database to determine a corresponding marshaling signal, determine a flight command based on the corresponding marshaling signal, and execute the flight command with the flight control system of the UAV.

In one embodiment, a method for unmanned aerial vehicle (UAV) control comprises detecting, with an image sensor of a UAV, a gesture from a ground crew member, verifying, with a control circuit, that the ground crew member is an authorized controller of the UAV, comparing, with the control circuit, the gesture with marshaling signals stored in an aircraft marshaling signal database to determine a corresponding marshaling signal, determining, with the control circuit, a flight command based on the corresponding marshaling signal, and executing the flight command with a flight control system of the UAV.

In one embodiment, an apparatus for unmanned aerial vehicle (UAV) control comprises a non-transitory storage medium storing a set of computer readable instructions and a control circuit configured to execute the set of computer readable instructions which causes the control circuit to: detect, with an image sensor of a UAV, a gesture from a ground crew member, verify that the ground crew member is an authorized controller of the UAV, compare the gesture with marshaling signals stored in an aircraft marshaling signal database to determine a corresponding marshaling signal, determine a flight command based on the corresponding marshaling signal, and execute the flight command with a flight control system of the UAV.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for unmanned aerial vehicle (UAV) control, comprising:
   a flight control system of a UAV;
   an image sensor on the UAV;
   an aircraft marshaling signal database; and
   a control circuit coupled to the flight control system, the image sensor, and the aircraft marshaling signal database, the control circuit being configured to:
   detect an initiate-control gesture from a ground crew member;
   verify that the ground crew member is an authorized controller of the UAV;
   in response to detection of the initiate-control gesture and verification that the ground crew member is an authorized controller of the UAV, cause the UAV to move in a predetermined pattern to provide an initiate-control acknowledgment to the ground crew member, the movement of the UAV in the predetermined pattern being separate from movement of the UAV in response to a flight command;
   detect, with the image sensor and after the verification that the ground crew member is an authorized controller, a gesture from the ground crew member;
   compare the detected gesture of the ground crew member with marshaling signals in the aircraft marshaling signal database to determine a corresponding marshaling signal;
   determine the flight command based on the corresponding marshaling signal; and
   execute the flight command with the flight control system of the UAV.

2. The system of claim 1, wherein the ground crew member is verified based on one or more of: a location of the UAV, a location of the ground crew member, a visual identifier associated with the ground crew member, a facial recognition algorithm, and a wireless signal transmitted by a transmitter device associated with the ground crew member.

3. The system of claim 1, wherein the flight command comprises a modification to a current task of the UAV.

4. The system of claim 1, wherein the flight command is determined further based on a current task of the UAV.

5. The system of claim 1, wherein the marshaling signals in the aircraft marshaling signal database comprise standardized marshaling signals from one or more of the North Atlantic Treaty Organization (NATO) Standardization Agreement 3117, Air Standardization Coordinating Committee Air Standard 44/42a, the International Civil Aviation Organization (ICAO), and the Federal Aviation Administration (FAA).

6. The system of claim 1, wherein the marshaling signals in the aircraft marshaling signal database correspond to directions to perform one or more of: travel straight ahead, turn left, turn right, move back, slow down, start engine, stop engine, take off, and land.

7. The system of claim 1, wherein the marshaling signals in the aircraft marshaling signal database further comprise specialized UAV marshaling signals corresponding to directions to: release package, pick up package, follow another UAV, and/or return to an origin location.

8. The system of claim 1, wherein the image sensor comprises one or more of a camera, an optical sensor, a night vision camera, and an infrared camera.

9. A method for unmanned aerial vehicle (UAV) control, comprising:
   detecting an initiate-control gesture from a ground crew member;
   verifying, with a control circuit, that the ground crew member is an authorized controller of the UAV;
   in response to the detecting of the initiate-control gesture and the verifying that the ground crew member is an authorized controller of the UAV, causing the UAV to move in a predetermined pattern to provide an initiate-control acknowledgment to the ground crew member, the movement of the UAV in the predetermined pattern being separate from movement of the UAV in response to a flight command;
   detecting, with the image sensor and after the verifying that the ground crew member is an authorized controller, a gesture from the ground crew member;
   comparing, with the control circuit, the gesture of the ground crew member detected with the image sensor with marshaling signals stored in an aircraft marshaling signal database to determine a corresponding marshaling signal;
   determining, with the control circuit, the flight command based on the corresponding marshaling signal; and
   executing the flight command with a flight control system of the UAV.

10. The method of claim 9, wherein the ground crew member is verified based on one or more of: a location of the UAV, a location of the ground crew member, a visual identifier associated with the ground crew member, a facial recognition algorithm, and a wireless signal transmitted by a transmitter device associated with the ground crew member.

11. The method of claim 9, wherein the flight command comprises a modification to a current task of the UAV.

12. The method of claim 9, wherein the flight command is determined further based on a current task of the UAV.

13. The method of claim 9, wherein the marshaling signals in the aircraft marshaling signal database comprise standardized marshaling signals from one or more of the North Atlantic Treaty Organization (NATO) Standardization Agreement 3117, Air Standardization Coordinating Committee Air Standard 44/42a, the International Civil Aviation Organization (ICAO), and the Federal Aviation Administration (FAA).

14. The method of claim 9, wherein the marshaling signals in the aircraft marshaling signal database correspond to directions to perform one or more of: travel straight ahead, turn left, turn right, move back, slow down, start engine, stop engine, take off, and land.

15. The method of claim 9, wherein the marshaling signals in the aircraft marshaling signal database comprise specialized UAV marshaling signals corresponding to directions to: release package, pick up package, follow another UAV, and/or return to an origin location.

16. An apparatus for unmanned aerial vehicle (UAV) control, comprising:
   a non-transitory storage medium storing a set of computer readable instructions; and a control circuit configured to execute the set of computer readable instructions which causes the control circuit to:

detect an initiate-control gesture from a ground crew member;
verify that the ground crew member is an authorized controller of the UAV;
in response to detection of the initiate-control gesture and verification that the ground crew member is an authorized controller of the UAV, cause the UAV to move in a predetermined pattern to provide an initiate-control acknowledgment to the ground crew member, the movement of the UAV in the predetermined pattern being separate from movement of the UAV in response to a flight command;
compare the detected gesture of the ground crew member with marshaling signals stored in an aircraft marshaling signal database to determine a corresponding marshaling signal;
determine the flight command based on the corresponding marshaling signal; and
execute the flight command with a flight control system of the UAV.

* * * * *